Nov. 1, 1966    F. A. DAVIS, JR., ETAL    3,282,173
THERMOPLASTIC BAG MANUFACTURING APPARATUS
Filed Sept. 16, 1963    3 Sheets-Sheet 1
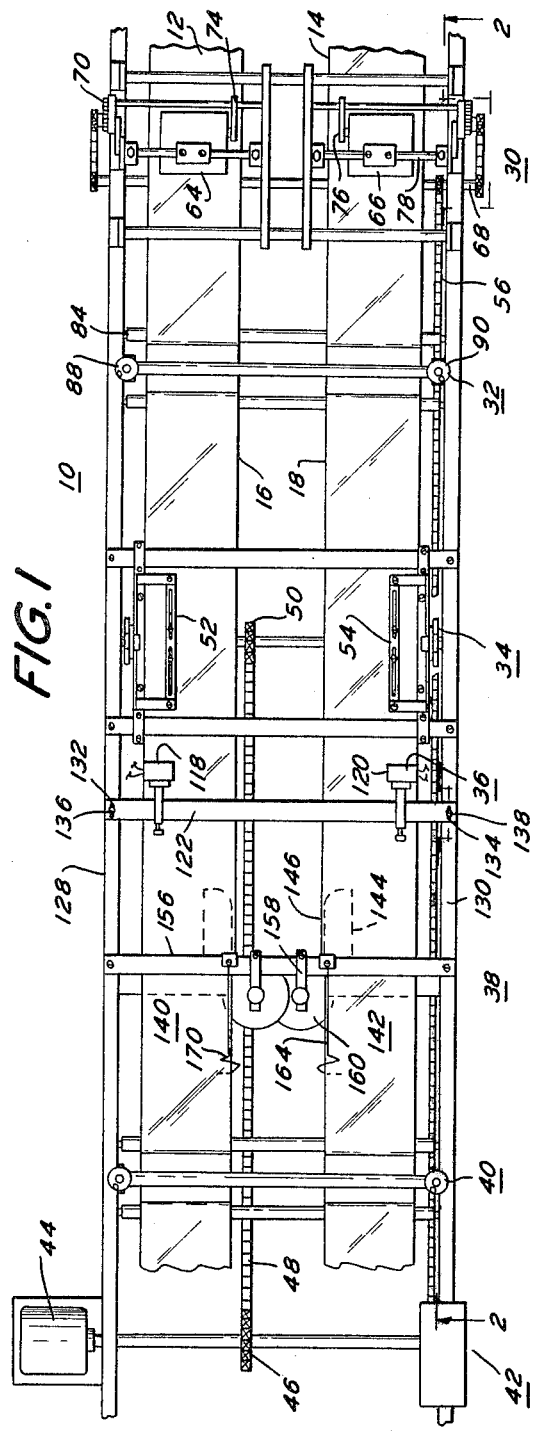
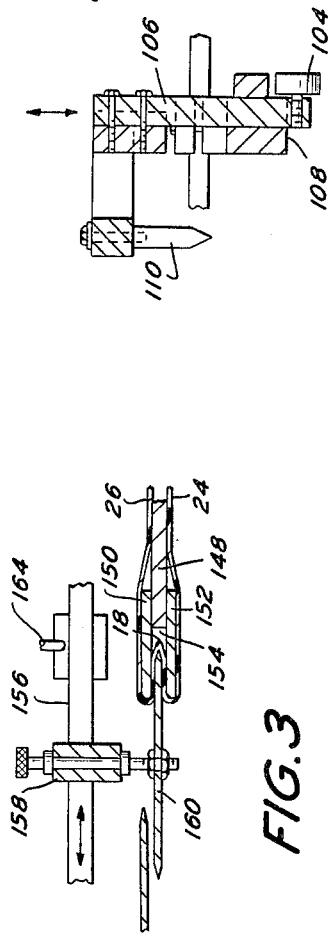
INVENTORS
FRANCIS A. DAVIS, JR.
JOSEPH F. FLANNERY
BY
*Arthur H. Seidel*
ATTORNEY

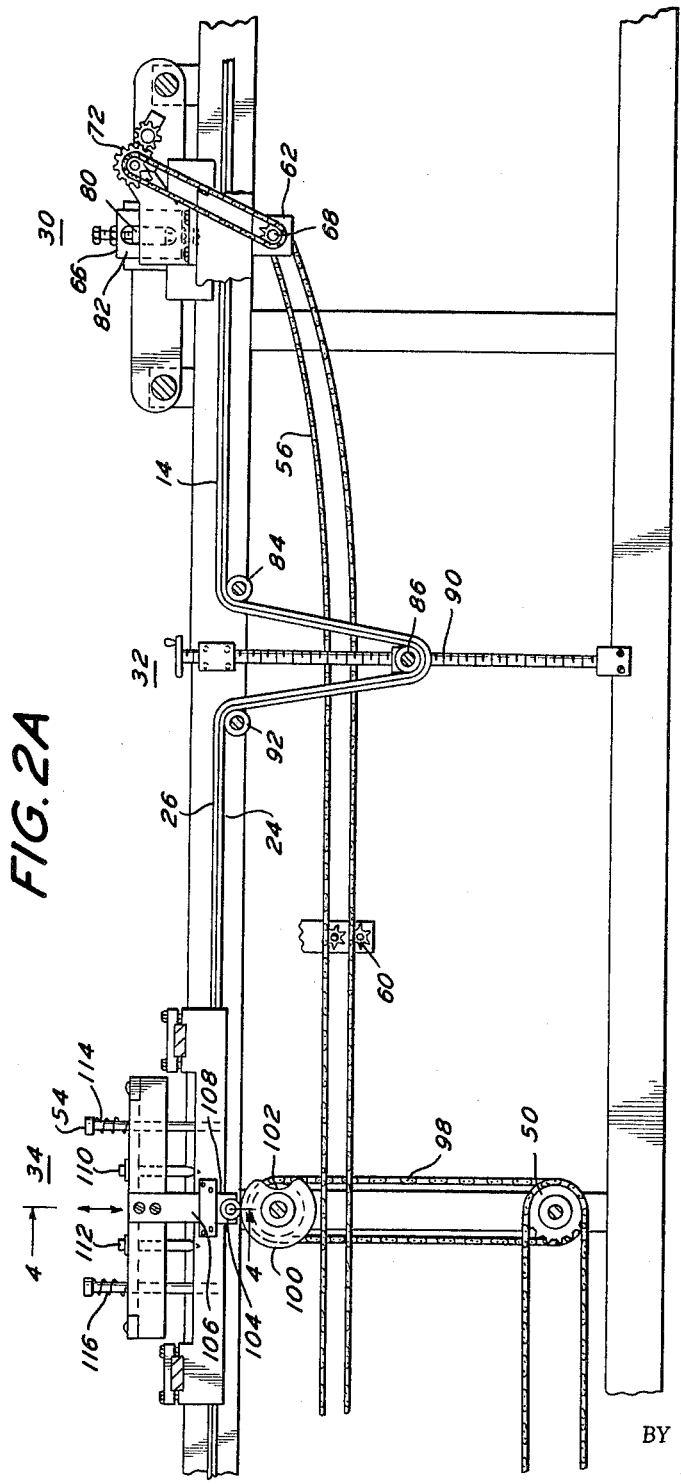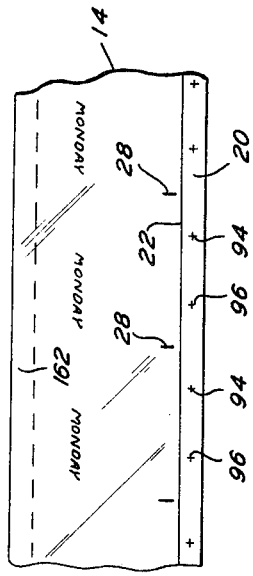

Nov. 1, 1966     F. A. DAVIS, JR., ET AL     3,282,173
THERMOPLASTIC BAG MANUFACTURING APPARATUS
Filed Sept. 16, 1963     3 Sheets-Sheet 3

INVENTORS
FRANCIS A. DAVIS, JR.
JOSEPH F. FLANNERY
BY Arthur H. Seidel
ATTORNEY

United States Patent Office 3,282,173
Patented Nov. 1, 1966

3,282,173
THERMOPLASTIC BAG MANUFACTURING
APPARATUS
Francis A. Davis, Jr., Lansdale, and Joseph F. Flannery, Mayfair, Pa., assignors to Paramount Packaging Corp., Chalfont, Pa., a corporation of Pennsylvania
Filed Sept. 16, 1963, Ser. No. 309,230
5 Claims. (Cl. 93—8)

In general, this invention relates to a new and improved thermoplastic bag manufacturing apparatus and, more particularly, to a side-weld machine for the multiple manufacture of plastic bags and the like with printed matter thereon.

As the technology in the manufacture of thermoplastic bags becomes more sophisticated, machines have been developed which can simultaneously cut and weld a plurality of bags from continuous thermoplastic webs at increased speeds. However, much of the auxiliary equipment necessary to produce certain types of thermoplastic bags is not ready for the high speed of the machine itself.

For example, where dated bags are to be manufactured (such as for bakery products), the standard means of imprinting the date on each bag is a roller printer such as the Gottscho printer. However, with prior art devices, this printer was capable of speeds only up to 50 bags per minute. If the speed of the machine was increased, in accordance with its capacity, the Gottscho printer would smear and vibrate. Thus, the increased speed of the machine was useless in the manufacture of dated plastic bags as the auxiliary equipment could not be combined with the machine.

Further, if the side-weld bags were of the gusset type, they were limited by the maximum speed at which the gusseter would operate. Thus, in prior art apparatus, the gusseter consisted of a forked unit in combination with a curved surface which guided the thermoplastic material into the gusset shape. However, at high speeds, the thermoplastic web would frictionally engage the curved surface and thus jam or break the web. This was, of course, quite undesirable.

Another piece of auxiliary equipment which was normally used in the manufacture of thermoplastic bags of the type having an exposed lip, was a perforator which would form holes in the exposed lip for receiving a wicket when the bags were stacked. The bags on a wicket were utilized for automatic machines in filling the bags. One such piece of auxiliary equipment is shown in U.S. patent application Serial No. 250,279, Patent No. 3,233,639, issued on February 8, 1966, entitled "Method of Packaging Materials," filed January 9, 1963, and invented by Francis A. Davis, Jr., and Joseph F. Flannery. In order to combine the function of this perforator with the other auxiliary equipment necessary for the high speed manufacture of dated thermoplastic bags, it was desirable to find a means for easily setting up the auxiliary equipment with respect to the other parts of the machine.

In the past, it was necessary to vary the spacing of rolls which held the thermoplastic web in tension in order to vary the spacing between portions of the machine such as the photoelectric cells, the cutter, the perforator, and the dater. This was an extremely cumbersome method and, therefore, not satisfactory.

Therefore, it is the general object of this invention to avoid and overcome the foregoing and other difficulties of the prior art practices by the provision of a new and better machine for making thermoplastic bags.

Another object of this invention is the provision of a new and more simple machine for making dated plastic bags in which the speed of operation is considerably increased.

Still another object of this invention is the provision of a new and better machine for making side-weld gusseted bags in which the speed of gusseting is substantially increased.

A further object of this invention is the provision of a new and better machine for making side-weld gusseted and dated bags which can be set up in a simple and easy manner.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top plan view of the apparatus of the present invention.

FIGURES 2a and 2b are a cross sectional view of the apparatus of FIGURE 1 taken along lines 2—2.

FIGURE 3 is a cross section view of the gusseter of the present invention taken along lines 3—3 in FIGURE 2b.

FIGURE 4 is a cross sectional view of the perforator of the present invention taken along lines 4—4 in FIGURE 2a.

FIGURE 6 is a top plan view of the web after gusseting and before the cutting thereof.

Figure 2B:
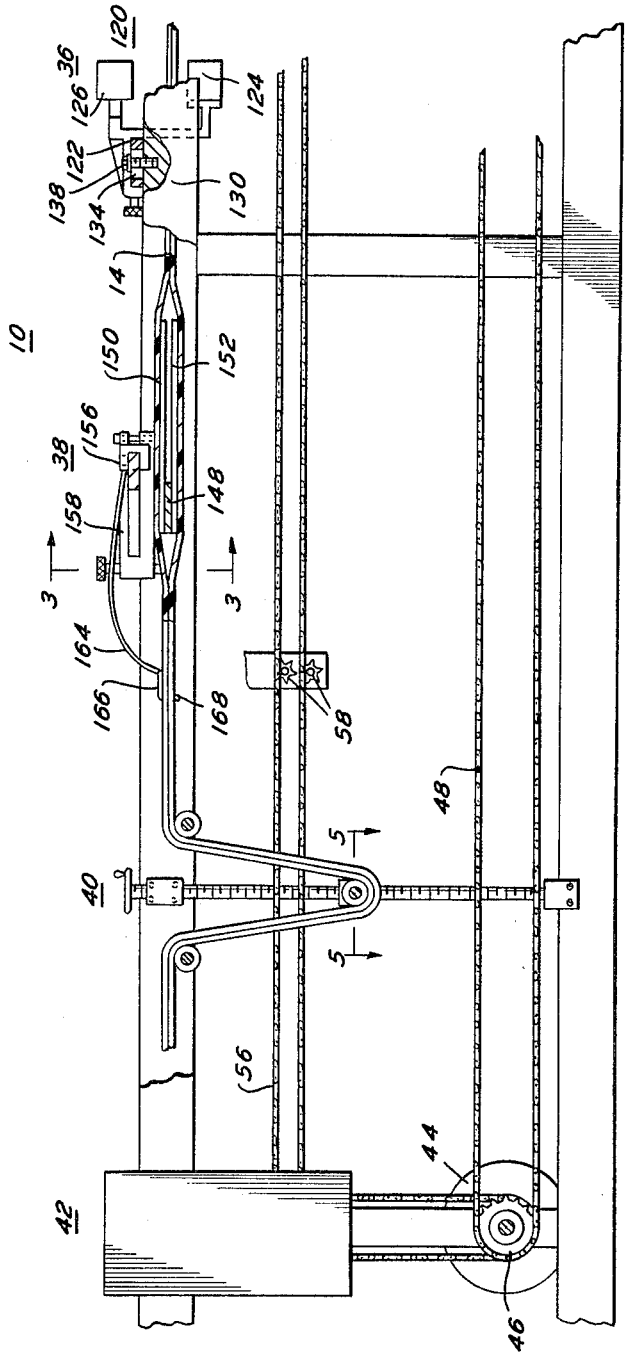

In FIGURES 1 and 2a and 2b, there is shown the apparatus of the present invention generally designated by the numeral 10. The apparatus 10 is intended to have fed therethrough a pair of spaced parallel thermoplastic webs 12 and 14. The webs 12 and 14 are folded over sheets of thermoplastic material having a single fold line 16 and 18 respectively. As can be seen in FIGURE 6, the web 14 has a longer lowermost portion which forms an extending lip 20 spaced from the outermost edge 22 of the uppermost portion of the web 14. The lowermost portion of the web 14 is generally designated by the numeral 24 and the uppermost portion by the numeral 26. Along the length of the web 14, printed on the uppermost portion 26 adjacent the edge 22 thereof, are plurality of photocell markers 28 for breaking the beam of the photocell unit to be discussed below so as to provide a signal for operating the cutter assembly of the present invention.

The webs 12 and 14 are first introduced through a date printing machine 30 of the type manufactured by the Gottscho Company of Hillside, New Jersey. From the date printing machine 30, the webs 12 and 14 pass through a take-up roll assembly 32 to a perforating unit 34. From the perforating unit 34, the webs 12 and 14 pass through a photocell pickup signalling apparatus 36 and thence to a gusseting station 38. Finally, the webs pass from the gussetting station 38 through a second pickup roll station 40 to an intermittent side seam welder and cutter 42.

It should be understood that the intermittent side seam welder and cutter 42 is a standard apparatus such as is shown in U.S. Patent 2,947,345, entitled "Machine for Making Articles From Multiple Thermoplastic Webs," by G. T. Schjeldahl, issued August 2, 1960. Further, the operation of the intermittent side seam welder and cutter 42 in accordance with the signals from a photocell such as the photocell pickup signalling apparatus 36 of the present invention is fully discussed in the above mentioned patent. Therefore, a complete description of the operation of the cutter 42 in accordance with signals received from the photocell pickup signalling apparatus 36 is deemed unnecessary.

The intermittent side seam welder and cutter 42 is driven by a motor 44 through a suitable gear and chain drive. The motor 44 is further connected through a gear 46 to a chain 48 to drive a gear 50 which is the motive power for the perforating unit 34. The perforating unit 34 consists of two perforators 52 and 54 respectively which are both driven in the same manner by gear 50. Therefore, only the perforator 54 will be discussed in detail.

The motor 44 through its gear train also drives a chain 56 supported along its length by sprockets 58 and 60 and connected to a gear mounted on a standard 62 adjacent the date printing machine 30. The machine 30 consists of two printing units 64 and 66 mounted above webs 12 and 14 respectively.

The printing units 64 and 66 are supplied power from the chain 56 through a common shaft 68 mounted on the standard 62. The shaft 68 drives gear systems 70 and 72 respectively associated with printing units 64 and 66. Gear systems 70 and 72 are connected through belt drives 74 and 76 to the printing units 64 and 66.

The printing units 64 and 66, as stated previously, are of the type manufactured by the Gottscho Company. These printing units were of the roller type, i.e., they printed while the web was moving thereunder. At speeds greater than 50 bags per minute, these printers would smear and/or vibrate thus ruining their effectiveness.

In order to increase the speed of these units, in accordance with the known potential speeds of the intermittent side seam welder and cutter 42, the printing units 64 and 66 were provided with a cross brace 78 mounted on a vertical slide block 80. The slide block 80 was mounted for vertical movement in suitable vertical position guides 82. Thus, by so mounting the printing units 64 or 66, the pressure exerted by the printer on the web could be varied by varying its vertical position. In this manner, at higher speeds, it was possible to lower the pressure of the printing unit on the web thus increasing its speed of printing potential. By merely mounting the printing units for vertical movement, it was possible to double the speed of printing capable with the Gottscho units.

Further, by insuring that the drive of the Gottscho units was directly connected to the drive for the intermittent side seam welder and cutter 42, exact synchronization of the printing units with the intermittent side seam welder and cutter 42 was possible.

After the webs 12 and 14 had passed from the printing units 64 and 66, they passed over a roller 84 which was a part of the take-up roll assembly 32. Take-up roll assembly 32 additionally included a vertically reciprocal roller 86 having its ends supported on vertically extending screws 88 and 90. After passing under the roller 86, the webs 12 and 14 passed over a third roller 92 of the take-up roll assembly 32. By varying the position of the roller 86 on the screws 88 and 90, it is possible to vary the spacing between the printing units 64 and 66 and the perforators 52 and 54.

The webs 12 and 14 pass from the roller 92 through the perforator 52 and 54 respectively. Only the perforator 54 will be discussed in detail, it being understood that the perforator 52 is exactly similar thereto.

The purpose of the perforator 54 is to form a pair of X-shaped perforations 94 and 96 equally spaced along each bag to be manufactured on the lip 20 thereof. The X-shaped perforations 94 and 96 are intended to be placed over the similar perforations 94 and 96 of every other bag which is stacked at the end of the apparatus 10 so that a wicket may be placed through them. The stack of bags and wicket can then be utilized on an automatic bag filling apparatus.

The perforator 54 is driven by the motor 44, gear 46, chain 48 and gear 50. The gear 50 drives a sprocket (not shown) which is mechanically linked through a chain 98 to a cam 100.

The cam 100 is circular over approximately 330° of its periphery and has an indented portion 102 of a constantly decreasing and then increasing radius less than the radius of the other 330° of the cam 100 surface. The cam follower 104 rests on the surface of the cam 100. Over 330° of its travel, the cam follower 104 is in a raised position.

Cam follower 104 is integrally connected to a vertical sliding member 106 which is received in a suitable vertical slide guide 108. Thus, when the cam follower 104 reaches the indentation 102, the vertical sliding member 106 will move downward. After this downward movement, the vertical sliding member 106 will be moved upward as it returns to the outer peripheral surface of the cam 100. The vertical sliding member 106 is integrally connected to spaced punches 110 and 112 which will form X-shaped perforations 94 and 96 respectively. Further, the vertical sliding member 106 is guided in its movement and resiliently biased in a downward direction by suitable biasing members 114 and 116. Thus, when the cam follower 104 reaches the indentation 102 on each complete rotation of the cam 100, the punches 110 and 112 will form a new set of X-shaped perforations 94 and 96. It should be noted that this is a direct synchronization of the operation of the perforator 54 with the intermittent side seam welder and cutter 42. That is, as each bag is cut and welded by the intermittent side seam welder and cutter 42, a new set of perforations is made by the punches 110 and 112.

Spaced from the perforators 52 and 54 is the photocell pickup signalling apparatus 36 which includes a pair of spaced photocell pickups 118 and 120 associated with the webs 12 and 14 respectively. The photocell pickups 118 and 120 are slidably mounted along a suitable support bar 122 so that they will be in registry with the photocell markers 28 on the uppermost portion 26 of the webs 12 and 14. As can be seen in FIGURE 2b, each of the photocell pickups 118 and 120 include a light source 124 and photosensitive element 126 which is connected to energize the intermittent side seam welder and cutter 42 in the manner discussed in U.S. Patent 2,947,345 mentioned previously.

The photosensitive element 126 continuously supplies an electric signal until a photocell marker 28 passes between the light source 124 and the photosensitive element 126 thus breaking the light beam therebetween and causing a signal to be transmitted to the intermittent side seam welder cutter 42 to cut another bag and seal the same. Thus, the date printing machine 30 and the perforating unit 34 which are synchronized with the intermittent side seam welder and cutter 42 are ultimately controlled by the photocell pickup signalling apparatus 36.

In order to insure proper spacing between the perforating unit 34 and the photocell pickup signalling apparatus 36, in prior art apparatus there would normally be placed a series of take-up rollers to adjust the spacing therebetween. However, in the present invention, this spacing is more simply controlled by the horizontal slide mounting of the support bar 122 on the slide frames 128 and 130 of the apparatus 10. That is, the support bar 122 is provided with longitudinally extending slots 132 and 134 spaced above the ends thereof resting on frames 128 and 130. A pair of bolts 136 and 138 are utilized to guide the support bar 122 and lock the support bar 122 in position on the side frames 128 and 130. Thus, the spacing between the photocell pickups 118 and 120 and the perforators 52 and 54 can be varied in accordance with the size of the bags to be manufactured by the apparatus 10. This can be done in a simple and easy manner without the necessity for varying take-up rollers whose tensions vary with the spacing thereof. Further, by eliminating take-up rollers, the photocell pickup signalling apparatus 36 can be placed within one bag length of the perforating unit 34 thus eliminating error and unnecessary length for the apparatus 10.

The webs 12 and 14 then pass from the photocell pick-up signalling apparatus 36 to the gusseting station 38. The gusseting station 38 includes two gusseters 140 and 142 for forming a gusset in webs 12 and 14 respectively along fold lines 16 and 18 respectively. Only gusseter 142 will be discussed in detail, it being understood that the gusseter 140 is exactly similar thereto.

Gusseter 142 includes a bifurcated inner member 144 which is placed between the lowermost portion 24 and uppermost portion 26 of the web 14 with its outermost edge 146 adjacent the fold line 18.

The bifurcated member 142 includes a center flat support 148 extending from the frame 130 and having a pair of flat plates 150 and 152 on opposite sides thereof to form the bifurcation. The flat plates 150 and 152 have only their side edges integral with the center flat support 148 so that a recess 154 is formed between the plates 150 and 152.

The gusset station 38 includes a gusseter support bar 156 having integrally connected thereto a disk support 158. The disk support 158 has a gusseter disk 160 rotatably mounted thereon. The gusseter disk 160 is a flat disk having a thickness less than the thickness of the recess 154 and having its outer edges within the recess 154. Thus, the gusseter disk 160 forms a gusset by forcing the fold line 18 into the recess 154. The flat plates 150 and 152 insure that a uniform gusset 162 is formed along the length of the web 14 as it is fed past the gusseter 142. The rotating gusseter disk 160 eliminates friction normally associated with this operation.

The gusset 162 formed by the gusseter 142 is made smooth and flat by a suitable gusset presser 164 mounted on the gusset support bar 156 and spaced from the disk 160. The gusset presser 164 is a wire extending from the gusset support bar 156 and having spaced flat portions 166 and 168 which extend over the upper and lower surface of the gusset 162 to flatten the gusset in the manner shown in FIGURE 2b. It will be understood that a similar gusset presser 170 is placed after the gusseter 140 associated with web 12. The gusset presser 170 is exactly similar in operation to the gusset presser 164.

Figure 5:
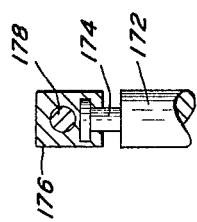
FIGURE 5 is a cross sectional view of the roll spacer taken along lines 5—5 in FIGURE 2b.

From the gusset presser, the web 14 is in the form shown in FIGURE 6. The second take-up roll station 40 receives this web 14 and varies the spacing between the photocell pickup signalling apparatus 36 and the intermittent side seam welder and cutter 42 in the manner discussed with respect to the first take-up roll assembly 32. It should be noted, as in FIGURE 5, that the vertically reciprocal roller 172 of the second take-up roll assembly 40 has its end 174 rotatably supported in a screw block 176 mounted on screw 178 for vertical reciprocation therewith. This operation is exactly similar to the operation of first take-up roll assembly 32.

The web 14 which is as shown in FIGURE 6, intermittently passes under a hot knife in the intermittent side seam welder and cutter 42. This knife extends perpendicular to the direction of travel of the webs 12 and 14, and is brought against the webs 12 and 14 as each marker 28 passes thereunder. The hot knife will cut the thermoplastic material of which the webs 12 and 14 are manufactured and at the same time will weld the uppermost portion 26 to the lowermost portion 24. In so welding, they will also weld the gusset 162 into place. These welds will form side seams along lines parallel to the photocell markers 28 for the finished bags.

It will be noted, that the perforations 94 and 96 will have been perfectly spaced along the lip 20 and that the bags will all be of uniform size. Further, the gusset will have been made and the date stamped as well as the perforations formed in a manner synchronized with the operation of the intermittent side seam welder and cutter 42. All of this has been accomplished at the high speeds capable of the intermittent side seam welder and cutter 42 without serious modification of auxiliary equipment. Further, the relative spacings between the auxiliary apparatus has been kept to a minimum and the apparatus 10 of the present invention can be set up in a simple and easy manner.

The present invention may be embodied in other specific forms without departing from the spirit or essential attributes thereof and, accordingly, reference should be made to the appended claims, rather than to the foregoing specification as indicating the scope of the invention.

We claim:

1. Thermoplastic bag manufacturing apparatus comprising frame, an intermittent side seam welder and cutter disposed on said frame, feed means associated with said frame for feeding a web of thermoplastic material longitudinally folded with a lowermost portion thereof extending further from the fold line than the uppermost portion thereof so as to define an exposed lip portion, a perforator on said frame, said perforator including at least one slitter positioned over the lip portion of the web as it is fed by said feed means, a printing unit disposed on said frame in spaced relation to said perforator, said perforator being disposed between said printing unit and said side seam welder and cutter, photocell pick-up apparatus disposed on said frame between said perforator and said side seam welder and cutter, drive means for said apparatus, and means mechanically coupling said drive means to said printing unit, said perforator and said side seam welder and cutter, said photocell pick-up apparatus being operatively connected to said drive means for actuating said drive means responsive to photocell markers on said web, whereby said printing unit, said perforator and said side seam welder and cutter are controlled by said photocell assembly.

2. Thermoplastic bag manufacturing apparatus in accordance with claim 1 wherein said printing unit includes vertical adjustment means for varying the pressure exerted by said printing unit on said web and said photocell pick-up apparatus includes a longitudinal position varying support for moving said apparatus longitudinally with respect to said frame in a direction toward and away from said side seam welder and cutter.

3. Thermoplastic bag manufacturing apparatus in accordance with claim 1, and a take-up roll assembly, said take-up roll assembly being mounted on said frame between said printing unit and said perforator, said take-up roll assembly including a vertically reciprocal horizontal roll, means for varying the vertical position of said vertically reciprocal horizontal roll, said last-mentioned means varying the length of said web between said printing unit and said perforator.

4. Thermoplastic bag manufacturing apparatus in accordance with claim 3, including a second take-up roll assembly, said second take-up roll assembly being mounted on said frame between said photocell pick-up apparatus and said side seam welder and cutter, said take-up roll assembly including a vertically reciprocal horizontal roll, means for varying the vertical position of said vertically reciprocal horizontal roll, said last-mentioned means varying the length of the said web between said photocell pick-up apparatus and said side seam welder and cutter.

5. Thermoplastic bag manufacturing apparatus in accordance with claim 4, and a gusseter on said frame, said gusseter including a bifurcated member adapted to be placed within said uppermost and lowermost portions adjacent to the fold line, a rotating disk, said rotating disk having a portion of the periphery thereof extending within the bifurcations of said bifurcated member, said rotating disk abutting the fold line of the web to form a gusset in the web, said gusseter being disposed between said photocell pick-up apparatus and said second take-up roll assembly.

(References on following page)

References Cited by the Examiner

UNITED STATES PATENTS

| | | | |
|---|---|---|---|
| 2,134,057 | 10/1938 | Putdevin | 93—34 X |
| 2,690,633 | 10/1954 | Denton. | |
| 2,884,988 | 5/1959 | D'Angelo. | |
| 2,947,345 | 8/1960 | Schjeldahl. | |
| 3,003,907 | 10/1961 | La Fleur | 93—8 X |
| 3,148,598 | 9/1964 | Davis | 93—8 |
| 3,168,016 | 2/1965 | Kehr | 93—8 |
| 3,183,797 | 5/1965 | Boone | 93—8 |

BERNARD STICKNEY, *Primary Examiner.*